United States Patent
Frerichs et al.

(10) Patent No.: US 7,113,890 B2
(45) Date of Patent: Sep. 26, 2006

(54) METHOD AND APPARATUS FOR DETECTING FAULTS IN STEAM GENERATOR SYSTEM COMPONENTS AND OTHER CONTINUOUS PROCESSES

(75) Inventors: Donald Karl Frerichs, Shaker Hts., OH (US); Frank Marvin Toth, Mentor, OH (US)

(73) Assignee: ABB Inc., Norwalk, CT (US)

( * ) Notice: Subject to any disclaimer, the term of this patent is extended or adjusted under 35 U.S.C. 154(b) by 0 days.

(21) Appl. No.: 10/962,150

(22) Filed: Oct. 7, 2004

(65) Prior Publication Data

US 2005/0096757 A1    May 5, 2005

Related U.S. Application Data

(60) Provisional application No. 60/511,998, filed on Oct. 16, 2003.

(51) Int. Cl.
| | |
|---|---|
| G06F 11/30 | (2006.01) |
| G06F 15/00 | (2006.01) |
| G06F 17/18 | (2006.01) |
| G06F 19/00 | (2006.01) |
| G21C 17/00 | (2006.01) |
| G05B 13/02 | (2006.01) |
| G05B 9/02 | (2006.01) |
| G06F 11/00 | (2006.01) |

(52) U.S. Cl. ................. 702/185; 702/179; 700/33; 700/51; 700/79; 700/174; 706/20; 706/48; 714/37; 714/40; 714/47; 714/48

(58) Field of Classification Search ............ 700/28–30, 700/32, 33, 44, 45, 47, 48, 21, 51, 79, 121, 700/174–178; 702/179, 181–185; 706/14–16, 706/17–20, 45–48; 714/1, 2, 15, 21, 32, 714/25–27, 37, 40, 44, 47, 48; 382/155–160
See application file for complete search history.

(56) References Cited

U.S. PATENT DOCUMENTS 3,581,714 A * 6/1971 Smith ..................... 122/1 R (Continued)

OTHER PUBLICATIONS

Soltysiak J T, "Modellbasierte Qualitätslenkung mit statistischen Methoden Grundprinzipien und Praxis", Automatisierungstechnische Praxis—ATP, May 1, 1996, vol. 38, No. 5, pp. 42-49, XP000583473 Issn: 0178-2320; Oldenbourg Verlag, Munchen, DE.

Primary Examiner—Crystal J. Barnes
(74) Attorney, Agent, or Firm—Michael M. Rickin; Paul R. Katterle

(57) ABSTRACT

A method and apparatus and for detecting faults in components of a continuous process such as a steam generator. A model of the process is developed using a modeling technique such as advanced pattern recognition and the model is used to generate predicted values for a predetermined number of the operating parameters of the process. Statistical process control methods are used to determine if the difference between the predicted and actual measured values for one or more of the parameters exceeds a configured statistical limit. A rule set is used to indicate an actual or probable fault in a component of the continuous process.

14 Claims, 7 Drawing Sheets

Methodology

U.S. PATENT DOCUMENTS

| | | | |
|---|---|---|---|
| 4,640,121 A | 2/1987 | Leuker et al. | |
| 4,960,079 A | 10/1990 | Marziale et al. | |
| 5,004,299 A * | 4/1991 | Brearley et al. | 303/15 |
| 5,363,693 A | 11/1994 | Nevruz | |
| 5,727,128 A * | 3/1998 | Morrison | 706/45 |
| 5,847,266 A | 12/1998 | Nevruz | |
| 6,076,048 A | 6/2000 | Gunther et al. | |
| 6,192,352 B1 | 2/2001 | Alouani et al. | |
| 6,223,544 B1 * | 5/2001 | Seem | 62/127 |
| 6,526,358 B1 * | 2/2003 | Mathews et al. | 702/51 |
| 6,567,795 B1 | 5/2003 | Alouani et al. | |
| 6,597,959 B1 * | 7/2003 | Backa et al. | 700/30 |
| 6,609,051 B1 * | 8/2003 | Fiechter et al. | 701/33 |
| 6,681,155 B1 * | 1/2004 | Fujita et al. | 700/287 |
| 2002/0099482 A1 * | 7/2002 | Reese et al. | 701/29 |
| 2003/0046026 A1 * | 3/2003 | Levy et al. | 702/181 |
| 2005/0154542 A1 * | 7/2005 | Frerichs et al. | 702/56 |
| 2005/0187649 A1 * | 8/2005 | Funk et al. | 700/121 |

* cited by examiner

| Measurement Location | | Pressure Sensor | Temperature Sensor | Flow Sensor | Power Sensor or Misc |
|---|---|---|---|---|---|
| 1 | Main Steam | X | X | | |
| 2 | HP Extraction Steam (1 to 4) | X | X | | |
| 3 | Cold Reheat Steam | X | X | | |
| 4 | Hot Reheat Steam | X | X | | |
| 5 | IP Turbine Extraction (1 to 4) | X | X | | |
| 6 | IP to LP Turbine crossover | X | X | | |
| 7 | LP Turbine Extraction (1 to 4) | X | X | | |
| 8 | LP FW Heater inlet (1 to 8) | X | X | X | |
| 9 | LP FW Heater Outlet (1 to 8) | | X | | |
| 10 | IP FW Heater Outlet (1 to 8) | | X | | |
| 11 | HP FW Heater Inlet (1 to 8) | | X | | |
| 12 | HPFWH Outlet (1 to 8) / Feedwater | X | X | X | |
| 13 | Makeup | | | X | |
| 14 | Main Steam Spray | X | X | X | |
| 15 | Reheat Spray | X | X | X | |
| 16 | Generator | | | | X |
| 17 | HP Turbine 1st Stage | X | | | |
| 18 | Condensate Pump (1 to 3) | | | | X |
| 19 | Boiler Feed Pump (1 to 3) | | | | X |
| 20 | Condenser | X | | | |
| 21 | HP FW Heater Drains (1 to 8) | | X | | |
| 22 | IP FW Heater Drains (1 to 8) | | X | | |
| 23 | LP FW Heater Drains (1 To 8) | | X | | |
| 24 | Steam Generator | | | | X |

Fig. 1a - Legend For Figure 1

FIG.2-Methodology

METHOD AND APPARATUS FOR DETECTING FAULTS IN STEAM GENERATOR SYSTEM COMPONENTS AND OTHER CONTINUOUS PROCESSES

CROSS REFERENCE TO RELATED APPLICATION

This application claims the priority of U.S. provisional patent application Ser. No. 60/511,998 filed on Oct. 16, 2003, entitled "A Method For Detecting Leaks In Tubes Of Steam Boilers" the contents of which are relied upon and incorporated herein by reference in their entirety, and the benefit of priority under 35 U.S.C. 119(e) is hereby claimed.

FIELD

This invention relates to continuous processes such as steam generators and more particularly to the detection of a fault in a component of the continuous process.

BACKGROUND

A continuous process system such as a steam generator process has many components. The steam generator system includes a boiler that has tubes through which water flows. Because of heat, pressure, and wear over time, the boiler tubes eventually begin to leak, i.e., the beginning of a "leak event." When a boiler tube(s) starts to leak, steam which flashes over from the water escaping through the leak therein is lost to the boiler environment. In general, the amount of leaked water/steam may be small at the inception of a tube leak event. However, unless the tube is repaired, the leak will continue to grow, i.e., the tube leak rate increases with time until the tube eventually ruptures. Further a rupture in one tube may damage adjacent tubes resulting in a huge overall leak. Thus, once a rupture occurs the utility operating the boiler is forced to shut the boiler down immediately.

Boiler tube failures are a major cause of forced shut downs in fossil power plants. For example, approximately 41,000 tube failures occur every year in the United States alone. The cost of these failures proves to be quite expensive for utilities, exceeding $5 billion a year. [Lind, M. H., "Boiler Tube Leak Detection System," Proceedings of the Third EPRI Incipient-Failure Detection Conference, EPRI CS-5395, March 1987].

In order to reduce the occurrences of such forced outages, early boiler tube leak detection is highly desirable. Early boiler tube leak detection would allow utilities to schedule a repair at a convenient time rather than to suffer a later forced outage. In addition, the earlier the detection, the better the chances are of limiting damage to adjacent tubes. Additional savings that result from early detection of boiler tube leaks accrue from items such as:
1) Shorter period of heat rate degradation;
2) Less ancillary damage caused by the leakage; and
3) Potential that the leak itself will be smaller if caught sooner.

Various methods are described in the prior art to detect boiler tube leaks. U.S. Pat. Nos. 6,567,795 and 6,192,352 describe a method that uses neural networks and fuzzy math. U.S. Patent Nos. 5,847,266 and 5,363,693 describe a method that uses input/output comparison. U.S. Patent Nos. 4,960,079 and 4,640,121 describe acoustical methods. None of the prior art methods work well due to poor model fidelity and inadequate fault tolerance. For example the acoustical method which detects the noise made by the leaking water must compete with the noisy environment present in the power house. Therefore, the result of the prior art methods are either numerous false alarms or real tube leaks that are not detected.

SUMMARY

A method for detecting a fault in a component of a continuous process. The method comprises developing a model of the continuous process; generating predicted values for a predetermined number of operating parameters of the continuous process using the model; comparing the value predicted by the model for each of the predetermined number of operating parameters to a corresponding actual measured value for the operating parameter; and determining whether differences between the predicted and actual measured values for one or more of the predetermined number of operating parameters exceeds a configured statistical limit using Statistical Process Control (SPC) methods.

A process plant. The plant has a computing device for detecting a fault in a component of a continuous process operating in the plant. The computing device is for:
 developing a model of the continuous process;
 generating predicted values for a predetermined number of operating parameters of the continuous process using the model;
 comparing the value predicted by the model for each of the predetermined number of operating parameters to a corresponding actual measured value for the operating parameter; and
 determining whether differences between the predicted and actual measured values for one or more of the predetermined number of operating parameters exceeds a configured statistical limit using Statistical Process Control (SPC) methods.

In a process plant that has a continuous process having one or more components; and a computing device for detecting a fault in the one or more components of the continuous process, the computing device is for:
 developing a model of the continuous process;
 generating predicted values for a predetermined number of operating parameters of the continuous process using the model;
 comparing the value predicted by the model for each of the predetermined number of operating parameters to a corresponding actual measured value for the operating parameter; and
 determining whether differences between the predicted and actual measured values for one or more of the predetermined number of operating parameters exceeds a configured statistical limit using Statistical Process Control (SPC) methods.

A computer readable medium having instructions for performing a method for detecting a fault in a component of a continuous process operating in a process plant. The instructions are for:
 developing a model of the continuous process;
 generating predicted values for a predetermined number of operating parameters of the continuous process using the model;
 comparing the value predicted by the model for each of the predetermined number of operating parameters to a corresponding actual measured value for the operating parameter; and
 determining whether differences between the predicted and actual measured values for one or more of the predetermined number of operating parameters exceeds a configured statistical limit using Statistical Process Control (SPC) methods.

An apparatus that has a processing device. The processing device is for:

developing a model of a continuous process;
generating predicted values for a predetermined number of operating parameters of the continuous process using the model;
comparing the value predicted by the model for each of the predetermined number of operating parameters to a corresponding actual measured value for the operating parameter; and
determining whether differences between the predicted and actual measured values for one or more of the predetermined number of operating parameters exceeds a configured statistical limit using Statistical Process Control (SPC) methods.

DESCRIPTION OF THE DRAWINGS

The patent or application file contains at least one drawing executed in color. Copies of this patent or patent application publication with color drawing(s) will be provided by the Office upon request and payment of the necessary fee.

FIG. 1a is a table showing the sensors that are each of the locations 1 to 24 of FIG. 1.

DETAILED DESCRIPTION

Figure 1:
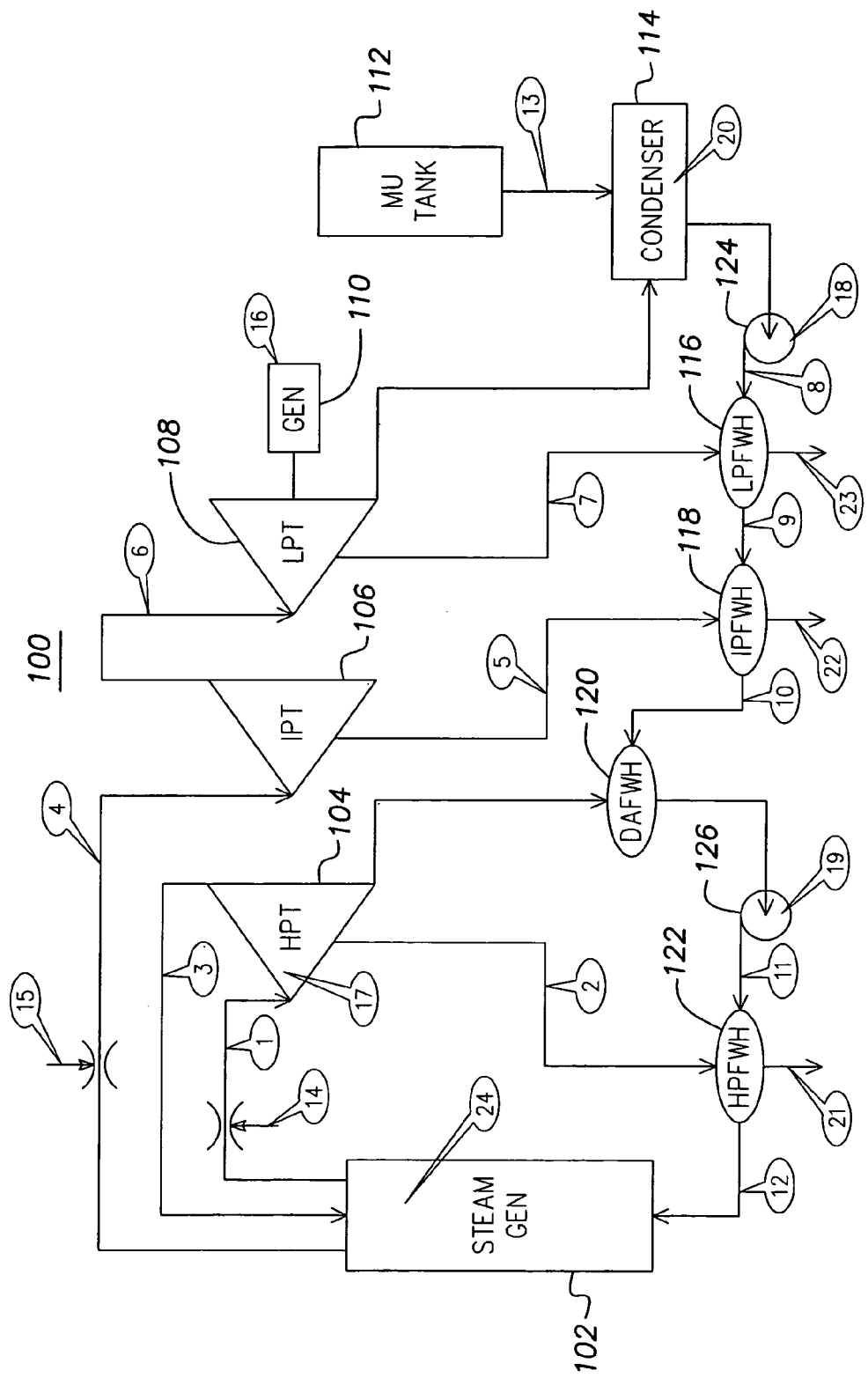
FIG. 1 is a diagram of a water/steam side process of a boiler/turbine power cycle.

Referring now to FIG. 1, there is shown a diagram of a process 100 which is the water/steam side of a boiler/turbine power cycle. As is well known to those of ordinary skill in the art, the water/steam side process 100 includes a steam generator 102, a high pressure turbine 104, an intermediate pressure turbine 106, a low pressure turbine 108, a generator 110, a make-up tank 112, a condenser 114, a low pressure feedwater heater 116, an intermediate pressure feedwater heater 118, a de-aerator feedwater heater 120, a high pressure feedwater heater 122, a condensate pump 124 and a boiler feed pump 126. While only one low pressure feedwater heater 116, one intermediate pressure feedwater heater 118 and one high pressure feedwater heater 122 are shown in FIG. 1, it should be appreciated that there are usually multiple heaters 116, 118 and 122 and that one heater is shown in FIG. 1 solely for convenience of illustration. It should also be appreciated that in some plants, heater 118 is located between heater 122 and boiler feed pump 126.

There is also associated with process 100 several types of sensors such as pressure sensors, temperature sensors, flow sensors and power or miscellaneous sensors. One or more of these sensors are at the measurement locations 1 to 24 in process 100. The table in FIG. 1a shows which of the sensors are at each of the locations 1 to 24.

In process 100, steam generator 102 generates high pressure steam. The high pressure steam, augmented by main steam spray, is fed to the high pressure turbine 104. Expanded steam from the high pressure turbine 104 is fed back to the steam generator 102 where it is reheated. The reheated steam, augmented by reheat spray, is fed to intermediate pressure turbine 106 and through that turbine to low pressure turbine 108. The steam from the low pressure turbine 108 is fed to condenser 114 where it is condensed into water. Additional water enters condenser 114 from make-up tank 112.

The water from condenser 114 flows through condensate pump 124 into the low pressure feedwater heater 116. Extraction steam from the low pressure turbine 108 is also fed into heater 116. The heated water from low pressure feedwater heater 116 is fed into intermediate pressure feedwater heater 118 which also receives extraction steam from intermediate pressure turbine 106. The heated water from intermediate pressure feedwater heater 118 is fed to de-aerator feedwater heater 120 which also receives water from high pressure turbine 104. The heated water from de-aerator feedwater heater 120 flows through a boiler feed pump 126 into high pressure feedwater heater 122. The heater 122 also receives water from high pressure turbine 104. The heated water from heater 122 flows to steam generator 102.

The present invention uses a steady state predictive model of the water/steam side of process 100 to detect tube leaks in the process. There are numerous methods to build such a model for a well-behaved system such as process 100. Several of these methods are:

1. First principles models—these can work well, but are expensive to build, and time consuming to calibrate to existing wear and tear conditions. Also, they tend to be intolerant of sensor drift or sensor failures.
2. Neural network empirical models—these models are an improvement to the first principles models because they automatically factor in current wear and tear conditions. However, they are very time consuming to build, and are not tolerant of subsequent sensor drifts, failures, or input sets completely outside of the training range.
3. Advanced Pattern Recognition empirical models also automatically factor in current wear and tear conditions. They have the added advantages of being quick and easy to build and are very tolerant of multiple sensor failures or drifting.

The Advanced Pattern Recognition (APR) technology, as is described below, was used in one embodiment of the present invention to construct a model of process 100. It should be appreciated that other techniques, including but not limited to the other methods described above, can also be used to construct models for use with the present invention. As is described in more detail below in connection with FIG. 2, after the APR model is constructed it is deployed in real time. One example of a software product that can be used to generate the APR model is the Optimize$^{IT}$ On-Target software available from the assignee of the present invention as of the earliest claimed filing date for this application.

The APR model can employ between about 50 and about 100 measured parameters of process 100. The exact number of measured process parameters used in a particular APR model is a function of the plant (e.g. the number of feedwater heaters and the number of turbine extraction points)

and the instrumentation that is available in the plant. If some of the process parameters are not available, the model fidelity will suffer slightly, but the present invention will still detect leaks although either detection of very small leaks may not be possible or there may be occurrences of not true indications that the technique has detected a leak, that is, "false alarms" may occur.

Figure 2:
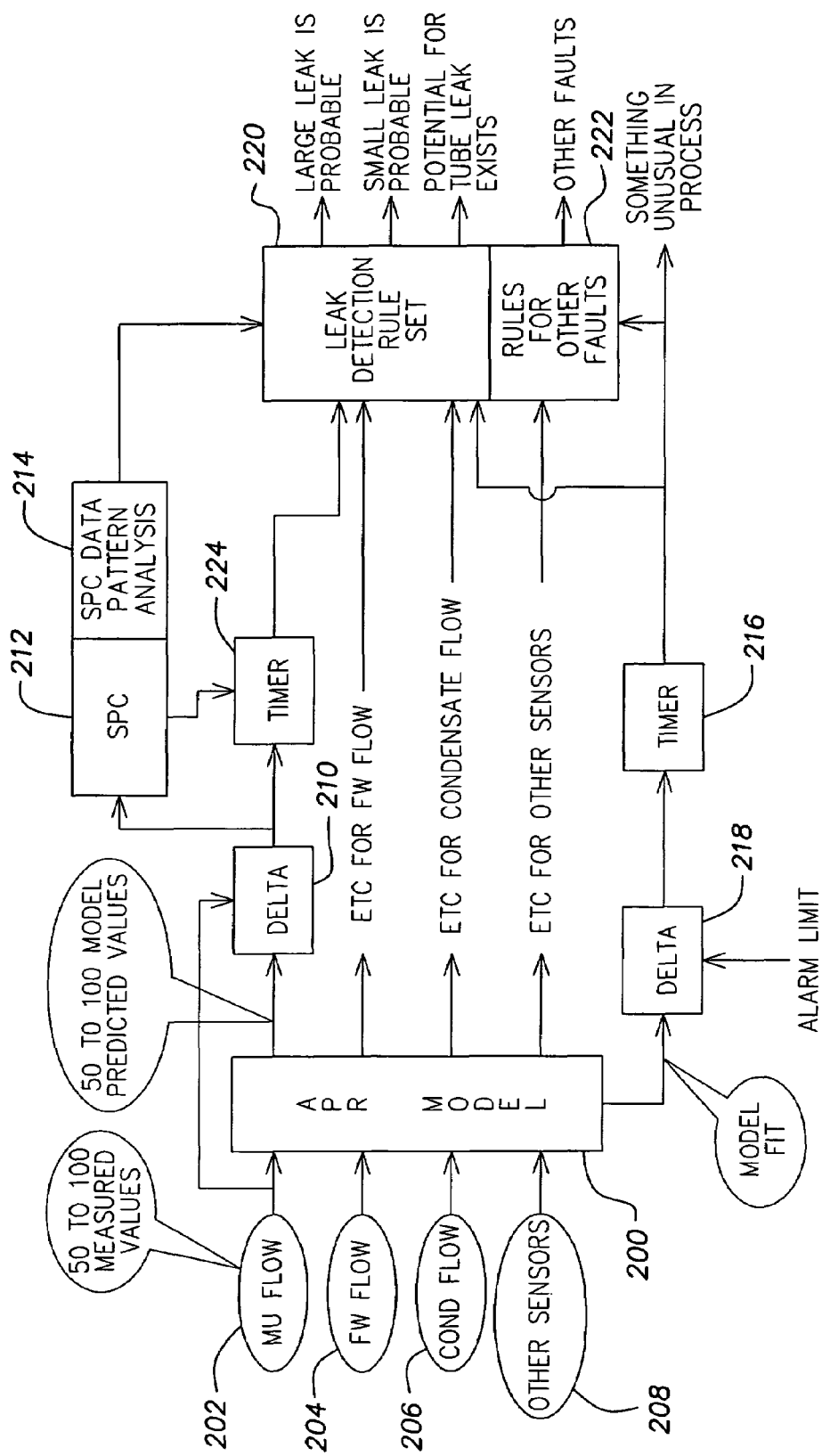
FIG. 2 is a block diagram showing the real time deployment of the Advanced Pattern Recognition model of the process shown in FIG. 1.

Referring now to FIG. 2, there is shown the real time deployment of the APR model 200 of process 100. The inputs to the APR model 200 are those of the about 50 to about 100 measured parameters three of which are identified in FIG. 2 as "MU Flow" 202, "FW Flow" 204 and "Cond Flow" 206 and the remainder of which are identified in FIG. 2 as "Other Sensors" 208. By reading in the current value of the parameters 202, 204, 206 and 208, the APR model 200 generates expected (or model predicted) values for each of these input parameters.

The expected value for each of the parameters 202, 204, 206, 208 is compared to the actual measured value and the difference between the two values, known as the "DELTA", is determined. For ease of illustration, FIG. 2 shows only the calculation 210 of the DELTA between the expected value and the actual measured value for the MU Flow 202 parameter. When the DELTA has a positive value, the actual measured value is greater than the expected value.

As is shown in FIG. 2 by block 212, statistical process control (SPC) methods can be applied to separate "normal" from "unusual" behavior for either a single point or groups of points. For ease of illustration, FIG. 2 shows only the SPC block 212 associated with the DELTA between the expected value and the actual measured value for the MU Flow 202 parameter. In the case of boiler tube leaks, it can be postulated that the DELTA for Makeup flow 202, Condensate flow 204 and Feed water flow 206 should become "unusual" shortly after a large leak occurs. Therefore SPC tools are applied to calculate standard deviations and test for exceeding the configured statistical limit.

The use of SPC methods in combination with the APR empirical model will under most system operating conditions alert the plant operator to the occurrence of a tube leak. Most units cycle load, at least on a daily basis, and perhaps more often and thus during load and other transients (e.g. coal pulverizer trip), it is possible that the DELTA values may become large enough to trigger a statistical limit. However, a persistence time factor can be added to the limit so that the alarm will not trigger until the DELTA values are statistically large in the positive direction continuously for a configurable period of time. This eliminates the transient effects.

As described above, the testing for statistical limits will alert the plant operator to the occurrence of larger leaks, but most leaks start out small and grow over time. In order to identify smaller leaks, the technique of the present invention can apply SPC data pattern testing as shown by block 214 of FIG. 2 to the DELTA values. For ease of illustration, FIG. 2 shows only the block 214 for the SPC data pattern testing of the DELTA between the expected value and the actual measured value for the MU Flow 202 parameter. The DELTA values can be tested for data patterns according to industry-accepted patterns, which may be the well known and accepted standard tests first developed by Western Electric, and/or patterns specifically created for use with the present invention or any combination of the industry standard and specially created patterns. The patterns are stored in block 214.

While there are many generally accepted pattern tests, of interest is one of "n" points in a row or "n" out of "m" points with a positive value. The values of "n" and "m" are established based upon the overall persistence time described above and the frequency of performing calculations in general. Another pattern test can be implemented for a sustained increasing trend (e.g. 5 out of 6 points in a row increasing) on the DELTA values.

Another parameter of great interest in determining the existence of a tube leak is the goodness of fit of the APR model 200 as a whole. All of the about 50 to about 100 Delta. values are used by the APR Model 200 in calculating a "Model Fit" parameter which ranges between 0.0000 and 1.0000. The technique used by the APR Model 200 to calculate the Model Fit parameter is determined by the vendor of the software used to make the APR model 200. A model fit parameter of 1.0000 represents a perfect model, that is, all of the about 50 to about 100 prediction outputs exactly match their corresponding input values and all Deltas equal 0.00000. A model fit parameter of 0.0000 represents a model so imperfect that no individual output is statistically close to the actual measured parameter. In practice, a good model fit parameter is one that has a value of about 0.97 most of the time.

When a tube leak (or other significant plant anomaly) occurs, the fit of the model as a whole degrades because many measured parameters are influenced. Some, such as the three flow signals, MU Flow 202, FW Flow 204 and Cond. Flow 206, will vary to a large degree and others such as FW pressure, opacity, $NO_x$ etc. will vary to a lesser degree. This degradation will cause the overall model fit parameter to degrade to values such as 0.94 or less in a very short period of time. Again statistical tests can be applied to the model fit parameter and the results of the statistical tests can be used in the malfunction rule set described below.

Of special interest are the Deltas for MU (Makeup) flow 202, total feedwater flow 204, and condensate flow 206 parameters. If a boiler tube leak is present, one skilled in the art would expect the actual value of each of these three parameters to be greater than their respective model predicted values. Thus the method of the present invention compares each of these three Deltas to their respective three sigma limits to determine if the deviation is both positive and statistically large. For ease of illustration, FIG. 2 shows only the comparison 224 of the Delta for the MU Flow 202 parameter. If any two of the three parameters 202, 204, 206 are beyond these statistically large limits for a period of time which is sufficient to remove transient measurement effects, then that is indicative of a large boiler leak. The particular period of time is specific to the power generation unit and depends on several factors including the steam generator, the instrumentation and where the instrumentation is mounted. During commissioning of the present invention, the time period is adjusted until the number of false or nuisance alarms due to load transients and other plant disturbances are considered by the plant operating personnel to be tolerable.

Again, if two of the three Deltas for the parameters 202, 204, 206 exhibit sustained periods of time where Delta values are slightly positive, that is, the actual value is greater than the predicted value, a smaller leak is probable. Finally, if one of the Deltas for the parameters 202, 204, 206 matches one of the patterns and the model fit parameter is less than a predetermined value for a predetermined period of time, this is indicative that a leak may be present.

All of the above tests are embodied in a leak detection rule set 220 within the software, and the rule set causes appropriate alarms or messages to be sent if true.

While development of such a rule is well within the capability of those of ordinary of the art, one example of such a tube leak rule is:

If for t minutes, the Model Fit Delta is greater than a and either:
the MU Flow Delta is greater than +b and the FW Flow Delta is greater than +c; or
the MU Flow Delta is greater than +b and the Cond Flow Delta is greater than +d; or
the FW Flow Delta is greater than +c and the Cond Flow Delta is greater than +d;
Then a large boiler tube leak is probable, where a, b, c, and d are fuzzy ranges for the associated parameters. The use of fuzzy ranges is a common method for the instantiation of If-Then style rules. The specific fuzzy range in engineering units, for example, lbs/hr, for each parameter a, b, c, and d will be different for each continuous process. Since the values for a, b, c, and d are fuzzy ranges, the result of each rule is a probability or certainty that the outcome is true. For example, the output of the present invention might be that it is 68% certain that a large boiler tube leak exists while simultaneously another rule might have an output that it is 95% certain that a small boiler tube leak exists.

Similarly, other well understood faults can be identified by using the technique of the present invention, that is, using the same APR process model 200, but with different measured parameters and DELTAs of interest. One example of these other faults are tube leaks inside feedwater heaters which can be detected using heater drain, heater inlet, and heater outlet temperatures with a feedwater heater tube leak rule set 222. Another example of these other faults are steam entering the drain cooler of a feedwater heater which can be detected using the same three parameters, that is, heater drain, heater inlet and heater outlet temperatures, and a rule set that is different than the feedwater heater tube leak rule set 222.

There may be occurrences in process 100 for which no rule sets have yet been written. Timer 216 and Delta 218, shown in FIG. 2, are used to alarm those occurrences.

The present invention is not limited to the steam generation process. It can be applied to other well-understood faults in other continuous processes. For example, excessive seal wear in gas compressors that will ultimately lead to compressor failure can be detected from an APR model of that process and a seal wear rule set.

The first step in building the empirical model 200 of process 100 is to assemble normal operational data from a plant historian for about 100 transmitters covering about 30 days of operation. These days can be selected to give the model 200 as wide a spectrum of normal operations as practical, e.g. different loads, different ambient conditions, different numbers of auxiliaries in operation, etc. Since the model 200 is a steady state model, the data need not be in clock/calendar sequence. The data collection frequency can be anywhere from every 5 minutes to every 15 minutes. At the same time, a second set of historical data covering the same data tags should be assembled from different calendar dates to validate the model 200 after it is constructed.

The APR model generation software used in the embodiment described herein is the Optimize$^{IT}$ On-Target software. That software connects to any brand of distributed control system (DCS) or historian, and includes tools to review the raw data and quickly discard any records with missing data or obvious outliers. Caution should be taken to retain records covering normal excursions and operational modes (e.g. HP FW Heater out of service) while eliminating records covering unusual excursions (e.g. load runback due to trip of the forced draft fan). Usually data below 30% unit load is ignored.

The second step is to eliminate duplicate (or very similar) records. Again, the APR model generation software should, as does the APR model generation software used in this embodiment, contain tools to simplify removal of such records. In this manner, thousands of data records can be reduced to less than 500 records in a matter of seconds.

The third step is to construct the model 200 from the training set, that is, the assembled normal operational data. The nature of Advanced Pattern Recognition technology allows a current generation PC to accomplish this task in less than 30 seconds which is far less time by many orders of magnitude than any other technology such as, for example, neural networks or multiple non-linear regression.

The fourth step is to validate the model 200 by using the model to predict values for a second or validation data set collected during the first step. For the embodiment described herein, the validation data set is actual plant data that contains about three weeks of data and includes a known boiler tube leak occurrence that began some time during the three weeks of data in the records.

Figure 3:
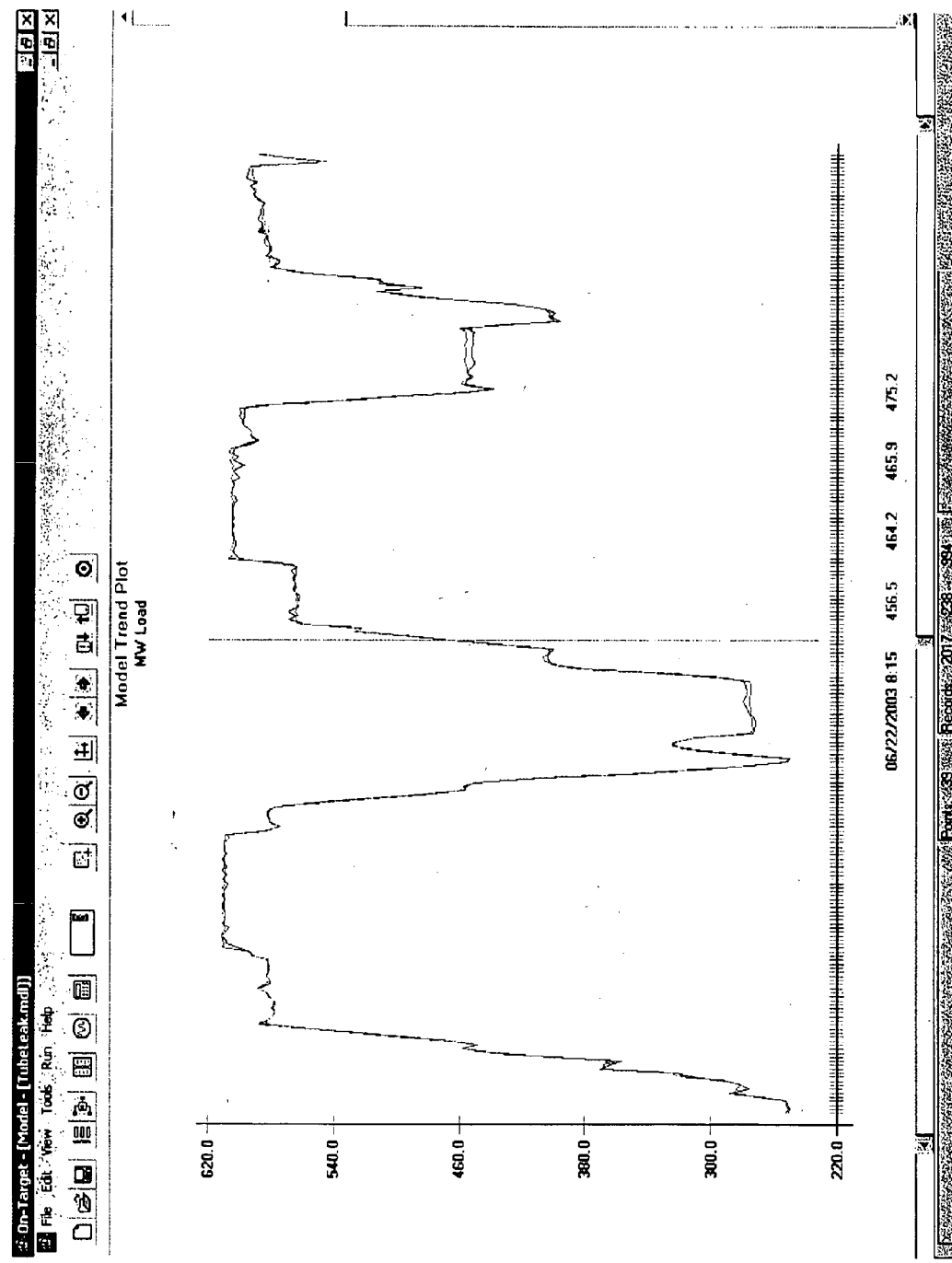
FIG. 3 is a plot in color showing the good agreement between the predicted values and actual data for a particular parameter used in the model.

As can be seen in FIG. 3, there is good agreement between predicted values (blue trace) and actual data (red trace) for MW Load in a selected 2.5-day period out of the three weeks. Since both traces are in good agreement it was necessary to use color for both traces in order to most clearly show these results. The same is true for all other days and most other parameters in the model.

Figure 4:
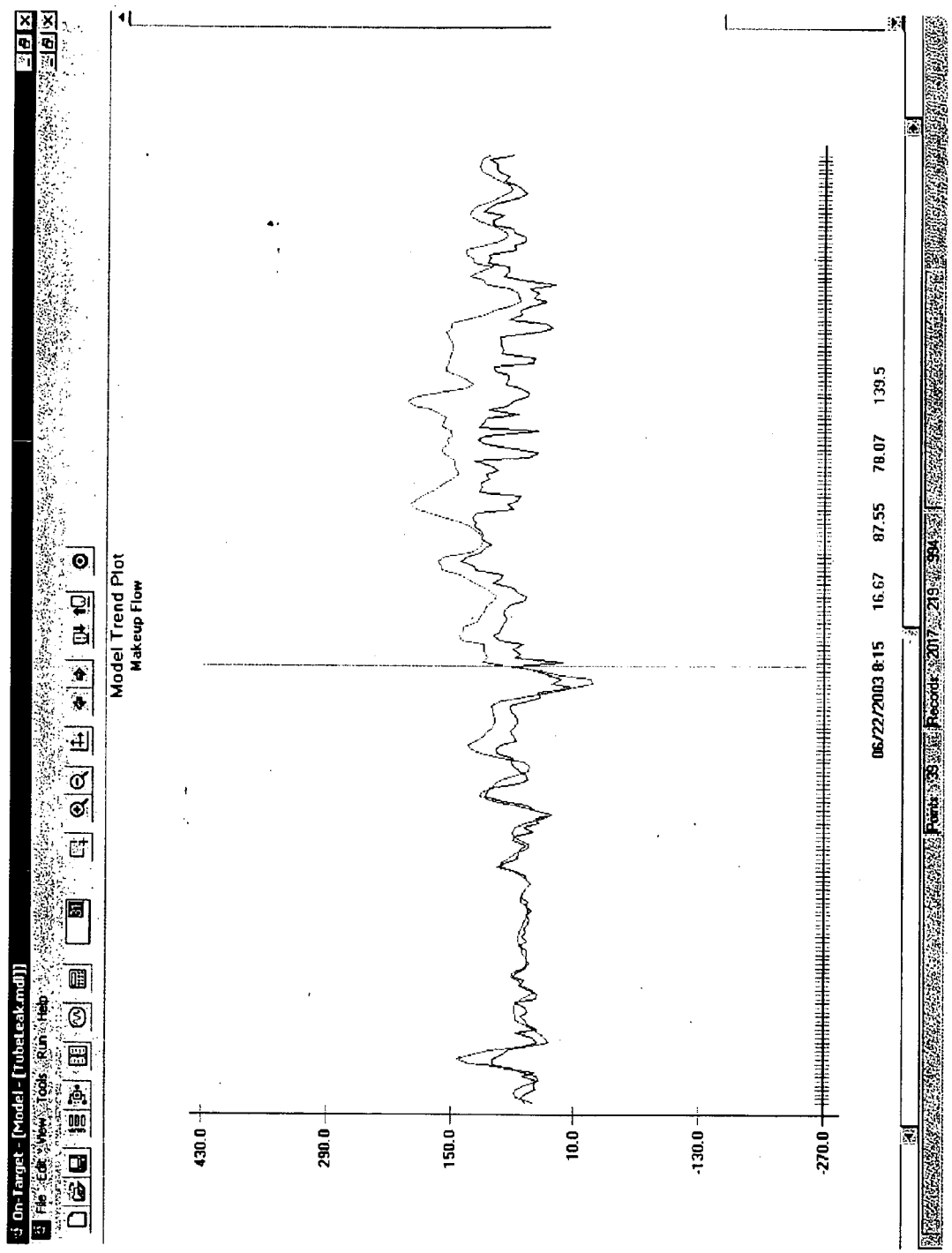
FIG. 4 is a plot showing the predicted and actual values for the Makeup Flow parameter.

However, in the case of Makeup Flow for the same 2.5-day period of time (FIG. 4), at the cursor position (record number 994) the actual value begins to exceed the prediction continuously. Since both traces in FIG. 4 are in close agreement over a portion of the traces it was necessary to use color for both traces in order to most clearly show these results.

Figure 5:
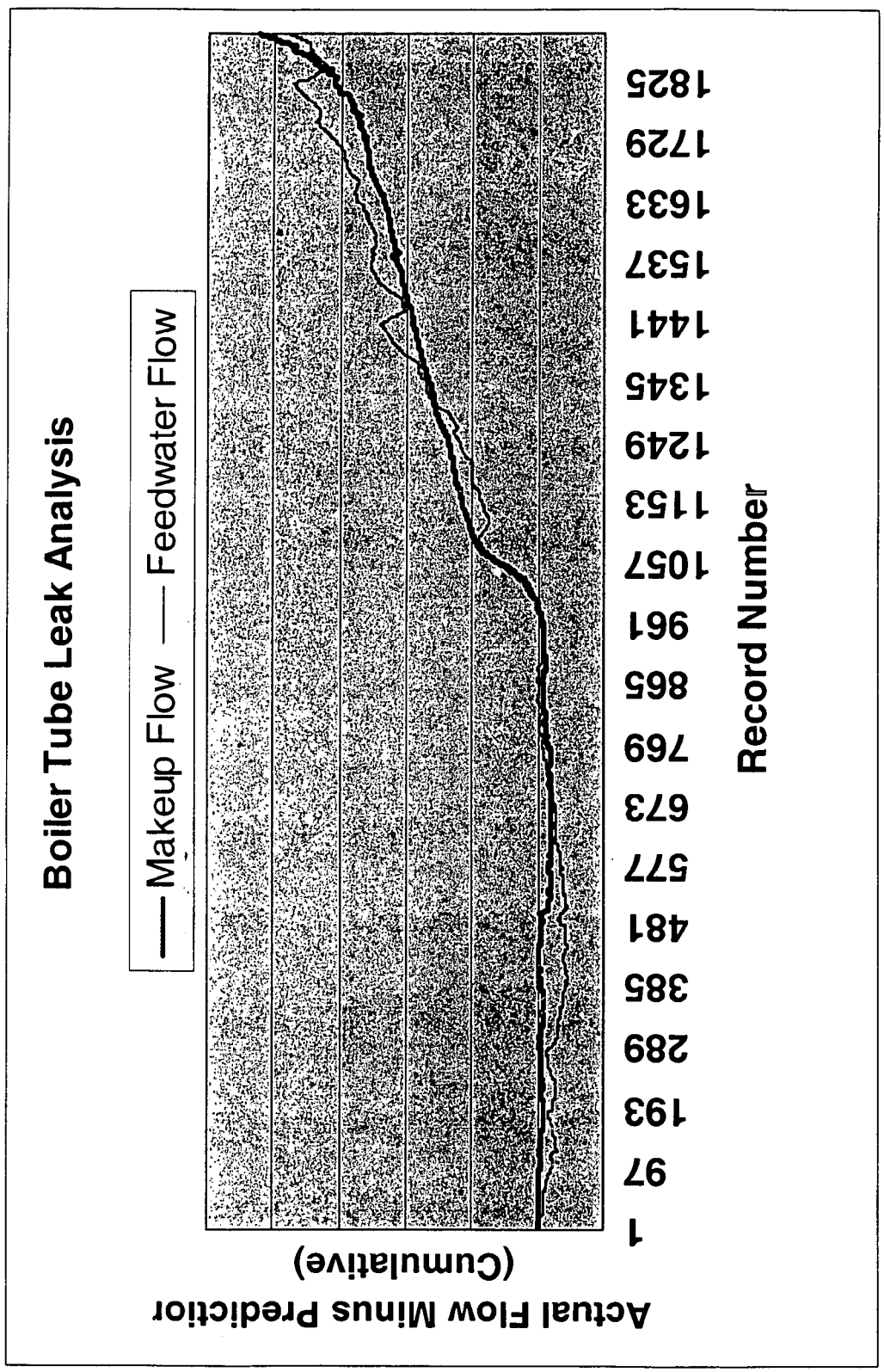
FIG. 5 is a plot showing the agreement and then the deviation of the actual value from the predicted value for the Makeup Flow and Feedwater Flow parameters used in the model.

To visualize the impact of this situation better, the DELTAs for any variable can be accumulated over the entire three week period. For most parameters, the cumulative difference will hover near zero. As is shown in FIG. 5, this is only true for both Makeup flow and feedwater flow until record 994. Then the actual values for both of those parameters continuously exceed the predictions which is indicative of a boiler tube leak. The slopes of the lines are somewhat proportional to the size of the leak. Since both traces in FIG. 5 are in close agreement over a large portion of the traces it was necessary to use color for both traces in order to most clearly show these results.

To implement the Statistical Process Control aspects of the present invention, the commercial off the shelf Advise$^{IT}$ Optimax Performance software package available from the assignee of the present invention as of the earliest claimed filing date of this patent application was selected, primarily for its tight integration with the On-Target Advanced Pattern Recognition software. Alarm limits with appropriate persistence levels are selected for the Makeup Flow, Feedwater flow and Condensate Flow DELTAs to detect the large leaks. The data pattern tests described earlier are activated for the same variables. The. Optimax Performance software also includes the tools to implement the rules governing the triggers for leak detection.

Figure 6:
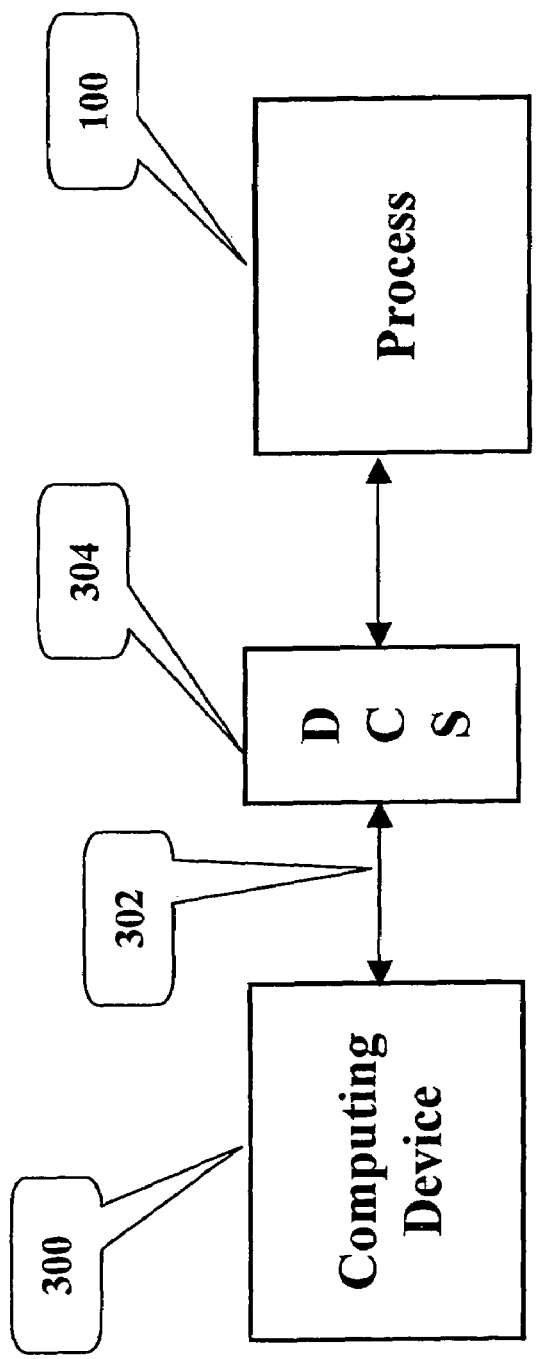
FIG. 6 is a block diagram showing a system including a computing device which may be used to implement the present invention.

The present invention may, as is shown in FIG. 6, be implemented in the form of a software program that runs on a computing device 300 that is connected to a process, which may for example be the process 100 of FIG. 1, by a data highway 302 and a distributed control system (DCS) 304. The data highway 302 has the capacity to interface with the sensors at measurement locations 1 to 24 of FIG. 1. The computing device 300, may for example, be any suitably arranged device such as a desktop PC that is capable of executing the program. The program may be a series of instructions on a suitable media such as a CD-ROM and computing device 300 has a suitable device such as the well known CDRW drive for receiving the CD-ROM so that the program can be read from the CD-ROM and loaded into device 300 for execution and if desired stored in a storage media such as a hard drive which is part of device 300.

The present invention has been shown and described with reference to the foregoing exemplary embodiments. It is to be understood, however, that other forms, details, and embodiments may be made without departing from the spirit and scope of the invention which is defined in the following claims.

What is claimed is:

1. A method for detecting a fault in a component of a continuous process, comprising:
   developing a model of said continuous process;
   generating predicted values for a predetermined number of operating parameters of said continuous process using said model;
   comparing the value predicted by said model for each of said predetermined number of operating parameters to a corresponding actual measured value for said operating parameter; and
   determining whether differences between said predicted and actual measured values for one or more of said predetermined number of operating parameters exceeds a configured statistical limit using Statistical Process Control (SPC) methods;
   wherein said predetermined number of operating parameters of said continuous process depends on said continuous process; and
   wherein said continuous process is the water/steam side of a boiler/turbine power cycle and said predetermined number of parameters include make-up flow, feedwater flow and condensate flow.

2. The method of claim 1 further comprising determining whether differences between said predicted and actual measured values for one or more of said predetermined number of operating parameters meets a predetermined SPC pattern test.

3. The method of claim 1 wherein said model is selected from an Advanced Pattern Recognition (APR) empirical model, a first principles model or a neural network empirical model.

4. The method of claim 3 further comprising calculating in said APR empirical model a Model Fit parameter from said differences between said predicted and actual measured values for one or more of said predetermined number of operating parameters.

5. The method of claim 1 wherein said predetermined number of operating parameters of said continuous process is between about 50 and about 100.

6. The method of claim 1 further comprising determining for each of said predetermined number of operating parameters a difference between said predicted values for said operating parameter and said actual measured value for said operating parameter.

7. The method of claim 6 wherein said difference for selected ones of said predetermined operating parameters are each compared to an associated three sigma limit.

8. The method of claim 6 further comprising determining a deviation for each of said differences for said make-up flow, feedwater flow and condensate flow operating parameters to a three sigma limit associated with each of said operating parameters.

9. The method of claim 8 further comprising indicating:
   a large leak in a tube of a boiler in said continuous process when said deviation for any two of said make-up flow, feedwater flow and condensate flow operating parameters are positive and statistically large for a predetermined period of time; and
   a small leak in a tube of said boiler when said deviation for any two of said make-up flow, feedwater flow and condensate flow operating parameters are slightly positive for a predetermined period of time.

10. The method of claim 8 further comprising: determining from all of said differences a parameter indicative of how good said model fits said continuous process;
    analyzing said deviation for each of said make-up flow, feedwater flow and condensate flow operating parameters in accordance with an associated predetermined pattern; and
    indicating that a leak may be present in a tube of said boiler when any one of said deviations matches said associated predetermined pattern and said parameter indicative of said model fit is less than a predetermined value for a predetermined period of time.

11. A process plant comprising:
    a computing device for detecting a fault in a component of a continuous process operating in said plant, said computing device for:
      developing a model of said continuous process;
      generating predicted values for a predetermined number of operating parameters of said continuous process using said model;
      comparing the value predicted by said model for each of said predetermined number of operating parameters to a corresponding actual measured value for said operating parameter; and
      determining whether differences between said predicted and actual measured values for one or more of said predetermined number of operating parameters exceeds a configured statistical limit using Statistical Process Control (SPC) methods;
    wherein said computing device is also for determining for each of said predetermined number of operating parameters a difference between said predicted values for said operating parameter and said actual measured value for said operating parameter;
    wherein said computing device is also for comparing said difference for selected ones of said predetermined operating parameters to an associated three sigma limit; and
    wherein said continuous process is the water/steam side of a boiler/turbine power cycle and said predetermined number of operating parameters include make-up flow, feedwater flow and condensate flow and said computing device is also for determining a deviation for each of said differences for said make-up flow, feedwater flow and condensate flow operating parameters to a three sigma limit associated with each of said operating parameters.

12. The process plant of claim 11 wherein said computing device is also for determining whether differences between said predicted and actual measured values for one or more of said predetermined number of operating parameters meets a predetermined SPC pattern test.

13. The process plant of claim 11, wherein said computing device is operable to indicate:
    a large leak in a tube of a boiler in said continuous process when said deviation for any two of said make-up flow, feedwater flow and condensate flow operating parameters are positive and statistically large for a predetermined period of time; and a small leak in a tube of said boiler when said deviation for any two of said make-up flow, feedwater flow and condensate flow operating parameters are slightly positive for a predetermined period of time.

14. The process plant of claim 11, wherein said computing device is operable to:

determine from all of said differences a parameter indicative of how good said model fits said continuous process;

analyze said deviation for each of said make-up flow, feedwater flow and condensate flow operating parameters in accordance with an associated predetermined pattern; and indicate that a leak may be present in a tube of said boiler when any one of said deviations matches said associated predetermined pattern and said parameter indicative of said model fit is less than a predetermined value for a predetermined period of time.

* * * * *